(12) United States Patent
Awan et al.

(10) Patent No.: US 10,655,054 B2
(45) Date of Patent: May 19, 2020

(54) FOAM-FORMING SURFACTANT COMPOSITIONS

(71) Applicant: Cytec Industries Inc., Princeton, NJ (US)

(72) Inventors: Azhar M. Awan, Woodstock, GA (US); David Vanzin, Franklin, TN (US); Dongcheel Lee, Wonmi-Gu Bucheon (KR); Eunyong Kim, Siheung (KR)

(73) Assignee: Cytec Industries Inc., Princeton, NJ (US)

( * ) Notice: Subject to any disclaimer, the term of this patent is extended or adjusted under 35 U.S.C. 154(b) by 176 days.

(21) Appl. No.: 15/168,220

(22) Filed: May 30, 2016

(65) Prior Publication Data

US 2016/0347990 A1 Dec. 1, 2016

(30) Foreign Application Priority Data

Jun. 1, 2015 (EP) ..................................... 15170153

(51) Int. Cl.
| | |
|---|---|
| C09K 8/584 | (2006.01) |
| C09K 8/60 | (2006.01) |
| C09K 8/94 | (2006.01) |
| C09K 8/594 | (2006.01) |
| E21B 43/16 | (2006.01) |

(52) U.S. Cl.
CPC .............. *C09K 8/584* (2013.01); *C09K 8/594* (2013.01); *C09K 8/602* (2013.01); *C09K 8/94* (2013.01); *E21B 43/16* (2013.01)

(58) Field of Classification Search
None
See application file for complete search history.

(56) References Cited

U.S. PATENT DOCUMENTS

| | | | |
|---|---|---|---|
| 2,623,596 | A | 12/1952 | Whorton et al. |
| 3,301,328 | A | 1/1967 | Campion |
| 3,333,634 | A | 8/1967 | Townsend et al. |
| 3,793,218 | A | 2/1974 | Canevari |
| 3,947,400 | A | 3/1976 | Burkhard et al. |
| 4,088,190 | A | 5/1978 | Fischer et al. |
| 4,252,657 | A | 2/1981 | Barriol et al. |
| 4,836,281 | A | 6/1989 | Robin et al. |
| 4,923,009 | A | 5/1990 | Watkins |
| 4,932,473 | A | 6/1990 | Borchardt |
| 5,062,970 | A | 11/1991 | Muijs et al. |
| 5,074,358 | A | 12/1991 | Rendall et al. |
| 5,203,411 | A | 4/1993 | Dawe et al. |
| 5,246,072 | A | 9/1993 | Frazier, Jr. et al. |
| 5,295,540 | A | 3/1994 | Djabbarah et al. |
| 5,358,045 | A | 10/1994 | Sevigny et al. |
| 5,363,915 | A | 11/1994 | Marquis et al. |
| 5,614,473 | A | 3/1997 | Dino et al. |
| 6,022,834 | A | 2/2000 | Hsu et al. |
| 6,113,809 | A | 9/2000 | Dino et al. |
| 6,269,881 | B1 | 8/2001 | Chou et al. |
| 6,828,281 | B1 | 12/2004 | Hou et al. |
| 6,989,355 | B1 | 1/2006 | Campbell et al. |
| 7,229,950 | B2 | 6/2007 | Shpakoff et al. |
| 7,262,153 | B2 | 8/2007 | Shpakoff et al. |
| 7,332,460 | B2 | 2/2008 | Campbell et al. |
| 7,381,332 | B2 | 6/2008 | Pena et al. |
| 7,422,064 | B1 | 9/2008 | Yang |
| 7,468,343 | B2 | 12/2008 | Campbell et al. |
| 7,482,650 | B2 | 1/2009 | Murata et al. |
| 7,556,098 | B2 | 7/2009 | Berger et al. |
| 7,612,022 | B2 | 11/2009 | Shpakoff et al. |
| 7,629,299 | B2 | 12/2009 | Berger et al. |
| 7,939,472 | B2 | 5/2011 | Crews |
| 7,985,718 | B2 | 7/2011 | Steinbrenner et al. |

(Continued)

FOREIGN PATENT DOCUMENTS

| | | |
|---|---|---|
| WO | 2006108161 A2 | 10/2006 |
| WO | 2010070502 A2 | 6/2010 |

(Continued)

OTHER PUBLICATIONS

International Search Report and Written Opinion for PCT/US2016/047565; dated Oct. 24, 2015; pp. 1-10.
Office Action of U.S. Appl. No. 15/240,573; dated Nov. 2, 2017; pp. 1-6.
International Search Report for PCT/US2016/034921; dated Sep. 20, 2016.
Written Opinion for PCT/US2016/034921; dated Sep. 20, 2016.

*Primary Examiner* — John J Figueroa
(74) *Attorney, Agent, or Firm* — Charles E. Bell, Esq.

(57) ABSTRACT

This invention relates to foam-forming surfactant compositions having at least two surfactants whereof at least one is a sulfosuccinamate, and at least one is a sulfosuccinate, and optionally including, a solvent. Methods of recovering oil or gas by generating a foam, feeding the foam into a subterranean oil- or gas-bearing geological formation, and collecting mineral oil or natural gas driven by the foam in a production well, wherein the foam is generated by intimate mixing of one or more foam-forming surfactant compositions described herein with a gas in a foam generator, or by introduction of at least one of water and gases, together or intermittently or in alternating sequence, slugs of a gas which may be in a supercritical or non-supercritical state, and of water, wherein the foam-forming surfactant composition(s) can be admixed to the water or to the gas if the gas is in a supercritical state or be introduced separately as solution into the geological formation, are also provided.

18 Claims, No Drawings

(56) References Cited

U.S. PATENT DOCUMENTS

| | | |
|---|---|---|
| 8,080,588 B2 | 12/2011 | Bittner et al. |
| 8,148,303 B2 | 4/2012 | Van Zanten et al. |
| 8,227,383 B2 | 7/2012 | Stokes et al. |
| 8,357,639 B2 | 1/2013 | Quintero et al. |
| 8,372,786 B2 | 2/2013 | Berkland et al. |
| 8,389,448 B1 | 3/2013 | Berger et al. |
| 8,389,456 B2 | 3/2013 | Stokes et al. |
| 8,403,044 B2 | 3/2013 | Hutchison et al. |
| 8,403,051 B2 | 3/2013 | Huang et al. |
| 2006/0260815 A1* | 11/2006 | Dahanayake .......... C09K 8/602 166/308.6 |
| 2008/0200351 A1 | 8/2008 | Dahanayake et al. |
| 2008/0302531 A1 | 12/2008 | Berger et al. |
| 2009/0127505 A1 | 5/2009 | Seal et al. |
| 2009/0221454 A1 | 9/2009 | Welton et al. |
| 2010/0010106 A1 | 1/2010 | Crews |
| 2010/0144942 A1 | 6/2010 | Kao |
| 2010/0216641 A1 | 8/2010 | Wang et al. |
| 2010/0311618 A1 | 12/2010 | Rey et al. |
| 2010/0311623 A1 | 12/2010 | Rey et al. |
| 2011/0009299 A1 | 1/2011 | Van Zanten |
| 2011/0048721 A1 | 3/2011 | Pope et al. |
| 2011/0105661 A1 | 5/2011 | Aksman |
| 2011/0174485 A1 | 7/2011 | Robb et al. |
| 2011/0183380 A1 | 7/2011 | El-Tahlawy et al. |
| 2011/0190128 A1 | 8/2011 | Ratschinski et al. |
| 2011/0220418 A1 | 9/2011 | Clark et al. |
| 2011/0223422 A1 | 9/2011 | Forshey et al. |
| 2012/0000708 A1 | 1/2012 | Van Zanten et al. |
| 2012/0004146 A1 | 1/2012 | Van Zanten et al. |
| 2012/0015852 A1 | 1/2012 | Quintero et al. |
| 2012/0024529 A1 | 2/2012 | Van Zanten et al. |
| 2012/0067729 A1 | 3/2012 | Kim |
| 2012/0090845 A1 | 4/2012 | Huang et al. |
| 2012/0186811 A1 | 7/2012 | Welton et al. |
| 2012/0234490 A1 | 9/2012 | Daniels et al. |
| 2012/0244058 A1 | 9/2012 | Ravishankar et al. |
| 2012/0245058 A1 | 9/2012 | Monteiro et al. |
| 2012/0260680 A1 | 10/2012 | Lee et al. |
| 2012/0264657 A1 | 10/2012 | Van Zanten |
| 2012/0288438 A1 | 11/2012 | Wang et al. |
| 2012/0308492 A1 | 12/2012 | Allef et al. |
| 2012/0322694 A1 | 12/2012 | Monteiro et al. |
| 2013/0048281 A1 | 2/2013 | Van Zanten et al. |
| 2017/0051195 A1 | 2/2017 | Vanzin et al. |

FOREIGN PATENT DOCUMENTS

| | | |
|---|---|---|
| WO | 2010075251 A1 | 7/2010 |
| WO | 2010118532 A1 | 10/2010 |
| WO | 2010138661 A1 | 12/2010 |
| WO | 2011088972 A1 | 7/2011 |
| WO | 2012154331 A2 | 11/2012 |
| WO | 2012154376 A2 | 11/2012 |
| WO | 2012161878 A1 | 11/2012 |
| WO | 2013184116 A1 | 12/2013 |

* cited by examiner

FOAM-FORMING SURFACTANT COMPOSITIONS

CROSS-REFERENCE TO RELATED APPLICATIONS

This application claims benefit of priority of EP Application No. 15170153.9 filed Jun. 1, 2015, which is incorporated herein by reference in its entirety.

FIELD OF THE INVENTION

This invention relates to foam-forming surfactant compositions, and to their use in recovery of oil and natural gas from subterranean oil-bearing geological formations.

BACKGROUND OF THE INVENTION

In the recovery of oil from a subterranean oil-bearing geological formation only a limited amount of the oil in place is recoverable by use of primary and secondary recovery processes. Primary production techniques (i.e. use of pressure in the formation) lead to the recovery of about 15% to 20% of the original oil in place (OOIP). Secondary water flooding techniques can recovery additional oil, leading to recovery of about 40% of the original oil in place. Several tertiary or enhanced oil recovery processes have therefore been developed to additionally recover some or all of the remaining oil.

Such tertiary processes include thermal processes (e.g., thermal injection), exemplary of which are steam flooding and in-situ combustion, chemical flooding techniques, and gaseous displacement fluid recovery methods (e.g., gas injection), which can be operated under either miscible or non-miscible conditions. The gases commonly utilized in these systems are commonly referred to as non-condensable gases and can include both natural gas and produced gas such as steam, carbon dioxide, nitrogen, methane, ethane, or mixtures of these along with other hydrocarbon homologues.

However, there are problems associated with the use of gaseous displacement fluid recovery methods. Fingering of the gas phase into the oil, leading to loss of the uniform displacement front, may take place, because of the higher mobility of the displacing gas.

A further problem is gravity override which is promoted by the viscosity and/or density difference between the gas and oil phases. Sweep efficiency, and contact between the injected fluid or gas and the oil in the reservoir, are reduced because of these problems, hence, the incremental recovery will as a result also be reduced. Reservoir heterogeneity will further increase these problems by promoting channelling, thereby further reducing the sweep efficiency.

In oil recovery operations, it is common practice to inject gaseous foams (gas in water, G/W) into the reservoir or subterranean oil- or gas-bearing geological formation to aid in the displacement and recovery of oil from the formation. Using surfactants and liquids, such as water based solutions, it is possible to create G/W foams for oil recovery operations. As these foams are injected into the reservoir, they will reduce the effects of (1) the poor mobility ratio between injected and reservoir fluids, (2) other causes of poor areal sweep efficiency, (3) poor vertical sweep efficiency, (4) non-oil saturated or thief zones, and (5) reservoir heterogeneities. Foams will assist in controlling the mobility of the gas through the formation, which is one approach for pushing and extracting the oil via enhanced technologies, and this will lead to the efficient extraction of more oil. Select foam products will also function as blocking and diverting agents, assuring that fluid which is extracting and emulsifying oil, flows through the desired parts of the formation and is not lost due to channelling into undesired areas. The foam is either generated in-situ by injecting the ingredients into the geological formation or is formed at the surface and injected as a foam per se. One favourable process involves injecting the surfactant solution and, once it is in position within the reservoir, then injecting the gas to form the foam.

The use of foams for mobility control has been well documented and described in the patent literature. Indeed, the current art details the usage of many types of surfactants as foaming agents for oil recovery operations. Some of the types of surfactants detailed in the art as generating high and long lasting foam include surfactants that have anionic, cationic, amphoteric, zwitterionic, and nonionic groups as hydrophilic groups, in addition to hydrophobic groups. Specific chemical classes include alkyl sulfonates, alkylaryl sulfonates, alkyl diphenyl ether disulfonates, arylsulfonates, alpha-olefin sulfonates, petroleum sulfonates, alkyl sulfates, alkylether sulfates, alkylarylether sulfates, betaines, ethoxylated and propoxylated alcohols, fluorosurfactants, sorbitan and ethoxylated sorbitan esters, and blends of these materials.

For example, an early document describing use of foams for mobility control is U.S. Pat. No. 2,623,596 A, where carbon dioxide is used as a miscible solvent gas. Numerous patent documents published more recently relate to improvements of this technology, such as U.S. Pat. No. 4,088,190 A, where injection of a fluid foam is described, made from carbon dioxide, water, and a foaming agent which is a straight-chain alkyl sulfoacetate. In U.S. Pat. Nos. 4,836,281 A and 4,923,009 A, fluorocarbon surfactants are used in an enhanced oil recovery process, as foaming agent and surface tension depressant. Foams made from inert gases and a fluorocarbon surfactant solution whereto amphoteric or anionic surfactants are admixed, have been known from U.S. Pat. No. 5,074,358 A. The use of mixtures of alkylated diphenyl oxide and at least one amphoteric surfactant as foaming agents has been disclosed in U.S. Pat. No. 5,203,411 A. A foam-forming composition is described in U.S. Pat. No. 5,358,045 A, which comprises water, a foaming agent which is an alpha-olefin sulfonate having from ten to sixteen carbon atoms, and a solubilising compound which is an alkali or earth alkali salt of a diphenyl ether disulfonic acid having alkyl substituents of from six to sixteen carbon atoms in one or both para positions with regard to the ether oxygen atom. A foam generated from a non-condensible gas, water, and a non-ionic surfactant is disclosed in U.S. Pat. No. 5,363,915 A. Increased foam quality and resistance to hydrocarbon defoaming has been found in U.S. Pat. No. 5,614,473 A when using imidazoline-based amphoacetates of high purity as amphiphilic surfactants. Additional presence of hydrocolloids such as xanthan gum is mentioned. In U.S. Pat. No. 6,113,809 A, generation of a sustainable foam is described using surfactants derived from imidazoline having a structure

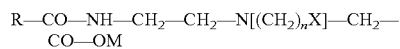

R—CO—NH—CH$_2$—CH$_2$—N[(CH$_2$)$_n$X]—CH$_2$—CO—OM with R being an aliphatic radical containing from five to nineteen carbon atoms per molecule, X being OH or NH$_2$, n being an integer of from 2 to 4, and M being a metal, where the surfactants must be in a pure state, i.e. substantially free from starting products. Mixtures of surfactants and cosurfactants have been described in U.S. Pat. No. 7,842,650 B2, where one of the constituents is broadly selected from the group of sulfates, sulfonates, phosphates, carboxylates, sulfo-succinates, betaines, quaternary ammonium salts, amine oxides, amine ethoxylates, amide ethoxylates, acid ethoxylates, alkyl glucosides, ethylene oxide-propylene oxide block copolymers, and long-chain fatty alcohol ethoxylates; and the other constituent is at least one cosurfactant different therefrom, of the structure x-y or x-y-z, in which x is a surfactant alcohol having six to twelve carbon atoms, y is an alkylene oxide block and z is a terminal group. Foam-forming compositions comprising mixtures of at least one non-ionic surfactant and at least one ionic surfactant which latter include anionic, cationic, and zwitterionic or amphoteric surfactants have been disclosed in U.S. Pat. No. 7,422,064 B1.

It is well known that the presence of hydrocarbon oils present in the geological formation can contribute to reducing or limiting the stability of the foam formed from aqueous solutions. Therefore, foaming efficiency is an important factor when foams are used to recover hydrocarbons from subterranean strata. Foam stability can also be reduced when the aqueous solution contains dissolved salts such as those that are commonly found in the geologic formations from which oil and natural gas are to be recovered. These salts typically contain cations such as sodium, potassium, lithium, calcium, magnesium and anions such as chloride, sulfate, carbonate, bicarbonate, fluoride etc. The most common types of aqueous media for the gas/water foams include seawater, seawater/diesel and brine solutions of various concentrations. Foam stability can further be reduced when the temperature of the oil or natural gas bearing formation is high. Typically, the higher the temperature the poorer is the stability of the foam. In many cases the temperature of the formation can be elevated, such as at least 30° C., 40° C., 50° C., 60° C., or even higher, such as 90° C. or 95° C.

Additionally, one major issue with the selection of surfactants for oil and gas recovery applications is that the properties of the oil and conditions of the reservoir can greatly influence surfactant selection and performance. In selecting a surfactant to serve as a foaming agent one must examine its performance in formulations and environments that will approximate the end use application. Selection of a surfactant foaming agent is influenced by the surfactant chemistry, composition of the brine and gas, nature of the porous medium, foam quality, texture and flow rate and temperature and pressure. Ideally, one is looking for a surfactant that exhibits good solubility in the brine at surface and reservoir conditions, has appropriate thermal stability under reservoir conditions, has a low adsorption onto the reservoir rock and does not partition to the crude oil. The surfactant should also exhibit a strong ability to promote and stabilise the foam, reduce gas mobility into the porous media and assure that the foam does not readily interact with crude oil in the porous media.

Surfactants for enhanced oil recovery applications that offer improved foaming performance in multiple (and diverse) aqueous media and that have a high tolerance to elevated temperatures, dissolved salts, and/or the presence of hydrocarbon oil, and which would thus provide for a high foaming efficiency, and lead to stable foams would be a useful advance in the art and could find rapid acceptance in the industry.

SUMMARY OF THE INVENTION

It has now been surprisingly discovered by the inventors, as further detailed below in the experiments leading to the invention, that foam-forming surfactant compositions including surfactant mixtures of at least one sulfosuccinamate surfactant with at least one sulfosuccinate surfactant, selected from monoester sulfosuccinate surfactants and diester sulfosuccinate surfactants, and blends thereof, as well as these surfactant mixtures blended with further surfactants which are, inter alia, alkanolamides, alkyl sulfates, alpha-olefin sulfonates, betaines, fatty acid soaps, fatty alcohol alkoxylates, ethoxylated sorbitan esters, and sulfobetaines produce increased amounts of stable foams that exhibit, inter alia, extended foam half-life in seawater, seawater/diesel mixtures, and brine. These surfactant mixtures may optionally comprise a solvent, which is preferably water, or an aqueous solution that also comprises salts, foam boosters such as xanthan gum, oils which may be hydrocarbon oils or vegetable oils, and thickeners or preservatives. Compared to foam-forming compositions of the prior art, these formulations offer improvements in the amount of foam generated, the foam stability and the lifetime of the foam.

In the experiments leading to the present invention, surfactants were incorporated in a mass fraction of 0.1% and 0.5% into seawater, and seawater/diesel mixtures. Air was utilised as the gaseous phase to form the foam, and was incorporated via mechanical means using a blender. The experiments were conducted at ambient (23° C.) and elevated (80° C.) temperatures.

The commercially desirable foam-forming surfactant compositions as described herein for the first time offer improved foaming performance in diverse aqueous media including seawater (usually containing an average mass faction of dissolved salts about 3.5%, the largest part of which is sodium chloride) and brine (i.e. aqueous salt solutions containing typically mass fractions of up to 12%, such as from 0.1% to 11%, of dissolved salts of monovalent and divalent cations). The improved surfactant compositions are functional both at ambient temperature (typically 23° C.), and lower temperatures, such as from 1° C. up to 23° C. or elevated temperatures, such as more than 23° C. up to 95° C. This needed improvement includes creating a formulation that offers greater overall foam volume, improved foam stability and maximum lifetime of the foam (i. e., foam half-life, the time required for 50% of the volume of the liquid media to separate out of the original foam). Moreover, the foam-forming surfactant compositions as fully described herein advantageously offer improved performance at lower concentrations thereby reducing environmental and worker exposure, while simultaneously exhibiting a lower tendency to form oil in water emulsions, which is also advantageous as it would simplify oil recovery in production.

Accordingly, in one aspect this invention relates to foam-forming surfactant compositions including at least two surfactants whereof at least one is a sulfosuccinamate, and at least one is a sulfosuccinate. In certain embodiments, the foam-forming surfactant compositions can optionally further include a solvent. Aqueous foam-forming surfactant compositions can be made therefrom by addition of water or aqueous salt solutions, such as seawater or brine, optionally in mixture with a hydrocarbon or a mixture of hydrocarbons, and effective foam-forming amounts of one or more foam-forming surfactant composition described herein. It is also possible to use supercritical gases as liquid media, whereto effective foam-forming amounts of the foam-forming surfactant compositions described herein are added. The types of surfactants detailed in the invention include anionic surfactants, mixtures of two or more anionic surfactants, and combinations of any of these with cationic, amphoteric, zwitterionic, and nonionic surfactants, and the gases may include, for example, one or more of air, carbon dioxide, nitrogen, methane, or other natural and produced gases.

In another aspect, the present invention includes methods for recovering petroleum or natural gas from a reservoir or subterranean oil- or gas-bearing geological formation during the injection of a gas using the foam-forming surfactant compositions according to the invention. The methods contemplated by the present invention include contacting the oil or gas in the formation with any one or more of the foam-forming surfactant compositions and the injected gas so as to assist in the recovery of oil. The methods contemplated herein for recovery of petroleum or natural gas using the foam-forming surfactant compositions described herein can be performed as part of any one or more of the primary, secondary, or tertiary recovery techniques standard to the industry.

These and other objects, features and advantages of this invention will become apparent from the following detailed description of the various embodiments of the invention taken in conjunction with the accompanying Examples.

DETAILED DESCRIPTION OF THE PREFERRED EMBODIMENTS

It has been found in the experiments underlying this invention that sulfosuccinamate type surfactants have a high tolerance to the presence of salts, hydrocarbons, and both of salts and hydrocarbons with regard to foam formation and foam stability, at ambient (i. e. between 20° C. and 25° C.), reduced (below 20° C., such as 10° C. or 15° C.) and elevated (at least 25° C., preferably at least 30° C., more preferred, at least 40° C., and preferably up to 95° C.) temperatures. This unexpected property can be even more increased by adding further surfactants of the sulfosuccinate type.

A sulfosuccinamate type surfactant is, in the context of this invention, a compound having the structure of formula I $$R-NX-CO-CHY^1-CHY^2-CO-O^-M^{4+},$$ (Formula I)

where $Y^1$ is H and $Y^2$ is ($SO_3^-M^{3+}$), or $Y^1$ is ($SO_3^-M^{3+}$) and $Y^2$ is H, $M^{3+}$ and $M^{4+}$ are cations, and may be the same or may be different, and are selected from groups 1 and 2 of the Periodic Table of the Elements, consisting of the alkali metals, and the earth alkali metals, preferably from $Li^+$, $Na^+$, $K^+$, and also from ammonium $NH_4^+$; R is a linear or branched or cyclic aliphatic radical having from eight to twenty-four carbon atoms, and optionally, one or more carbon-carbon double bonds, or a mixture of two or more of such radicals. X can be a hydrogen atom, or can be an alkylcarboxylate group $—(CR^aR^b)—COO^-M^{2+}$ where $R^a$ and $R^b$ may both by H, or $R^a$ is H and $R^b$ is $—CH_2—COO^-M^{1+}$, where $M^{1+}$ and $M^{2+}$ are cations, and may be the same or may be different, and are selected from groups 1 and 2 of the Periodic Table of the Elements, consisting of the alkali metals, and the earth alkali metals, preferably from $Li^+$, $Na^+$, $K^+$, and also from ammonium $NH_4^+$. Particularly preferred alkali metal ions for $M^{1+}$, $M^{2+}$, $M^{3+}$, and $M^{4+}$ are, independently from each other, the sodium cation, $Na^+$, and the potassium cation, $K^+$.

In the case of using earth alkali metals to provide the cations in the surfactants of this invention, of course, the amount of substance of their divalent cations is only half of the amount of substance needed of the monovalent cations of alkali metals and ammonium.

A particularly preferred sulfosuccinamate is that of formula II

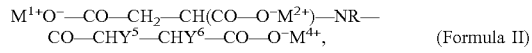
$$M^{1+}O^--CO-CH_2-CH(CO-O^-M^{2+})-NR-CO-CHY^5-CHY^6-CO-O^-M^{4+},$$ (Formula II)

where $Y^5$ is H and $Y^6$ is ($SO_3^-M^{3+}$), or $Y^5$ is ($SO_3^-M^{3+}$) and $Y^6$ is H, $M^{1+}$, $M^{2+}$, $M^{3+}$, and $M^{4+}$ are cations, and may be the same or may be different, and are selected from groups 1 and 2 of the Periodic Table of the Elements, consisting of the alkali metals, and the earth alkali metals, preferably from $Li^+$, $Na^+$, $K^+$, and also from ammonium $NH_4^+$; R is a linear or branched or cyclic aliphatic radical having from four to twenty-four carbon atoms, and optionally, one or more carbon-carbon double bonds, or a mixture of two or more of such radicals.

Particularly preferred alkali metal ions are the sodium cation, $Na^+$, and the potassium cation, $K^+$. A particularly preferred salt is the tetrasodium salt where $M^1$, $M^2$, $M^3$, and $M^4$ are all Na.

Particularly preferred is a mixture of the sodium salts of sulfosuccinamate surfactants that have saturated octadecyl and mono-unsaturated octadecenyl radicals in their molecules such as those derived from tallow amine which is a mixture of alkylamines provided from natural sources, and comprises both saturated octadecyl and mono-unsaturated octadecenyl groups as alkyl groups.

Sulfosuccinate type surfactants have the general formula III

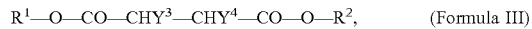
$$R^1-O-CO-CHY^3-CHY^4-CO-O-R^2,$$ (Formula III)

where
$Y^3$ is H and $Y^4$ is ($SO_3^-M^+$), or $Y^3$ is ($SO_3^-M+$) and $Y^4$ is H,
both $R^1$ and $R^2$ may be the same or may be different from each other, and each selected from the group consisting of linear or branched or cyclic aliphatic radicals having from four to twenty-four carbon atoms, and optionally, one or more carbon-carbon double bonds, or a mixture of two or more of such radicals, these sulfosuccinates being referred to as "diester sulfosuccinates", or
one of $R^1$ and $R^2$ may be selected from the group consisting of linear or branched or cyclic aliphatic radicals having from eight to twenty-four carbon atoms, and optionally, one or more carbon-carbon double bonds, or a mixture of two or more of such radicals, and the other of $R^1$ and $R^2$ is a hydrogen atom, H, or a metal M selected from the group consisting of the alkali metals of group 1 of the Periodic Table of the Elements which may preferably be Li or Na or K, an ammonium group $NH_4$, and the earth alkali metal of group 2 of the Periodic Table of the Elements which may preferably be Mg or Ca; in this latter case, of course, only half of the amount of substance of a monovalent alkali metal is used; these metals M are present, for any mention thereof in this application, in aqueous or other polar media in the form of their cations $M^+$ which are preferably $Li^+$ or $Na^+$ or $K^+$, or an ammonium group $NH_4^+$, or an earth alkali metal of group 2 of the Periodic Table of the Elements which may preferably be $Mg^{2+}$ or $Ca^{2+}$,
these sulfosuccinates being referred to as "monoester sulfosuccinates", and
$M^+$ is selected from cations of groups 1 and 2 of the Periodic Table of the Elements, consisting of the alkali metals, and the earth alkali metals, preferably from $Li^+$, $Na^+$, $K^+$, and also from ammonium $NH_4^+$.

Preferred are also diester sulfosuccinates having linear, branched or cyclic alkyl groups from four to twenty carbon atoms in $R^1$ and $R^2$, independently from each other, and $M^+$ being as described for the monoester sulfosuccinates; particularly preferred are $Li^+$, $Na^+$, $K^+$ and $NH_4^+$ as cations $M^+$. Most preferred are diester sulfosuccinates having branched or cyclic saturated alkyl groups $R^1$ and $R^2$ of from four to eight carbon atoms, such as sodium di(2-ethylhexyl) sulfosuccinate, sodium diisobutyl sulfosuccinate, sodium diamyl sulfosuccinate, sodium di(1,3-dimethylbutyl) sulfo-succinate, sodium dicyclohexyl sulfosuccinate. Also preferred are long chain alkyl diester sulfosuccinates having alkyl groups with from eight, or preferably, from ten, to twenty carbon atoms in the alkyl groups such as sodium di(tridecyl) sulfosuccinate. Other preferred diester sulfosuccinates are those where a mixture of aliphatic radicals $R^1$ and $R^2$ is used, such as mixtures of alkyl radicals having from ten to eighteen carbon atoms.

Also preferred are monoester sulfosuccinates where only one of $R^1$ and $R^2$ is an organic radical, and the other stands for an alkali metal which is preferably Na or K or Li, or the group $NH_4$. In this case, the organic radical $R^1$ or $R^2$ preferably having from eight to twenty-four carbon atoms may be directly bound to the carboxyl carbon atom via an oxygen atom, or it may be bound to the carboxyl carbon atom via an oligo-alkyleneoxy group as

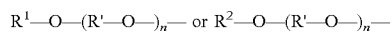

which has an alkylene group R' having two or three carbon atoms, preferably two carbon atoms, or a mixture of different R' with either two or three carbon atoms, where further preferably, more than 60% of the alkylene groups are ethylene groups, and n may preferably be from one to thirty.

Preferred monoester sulfosuccinates are poly(oxy-1,2-ethanediyl), alpha-(3-carboxy-1-oxo-sulfopropyl)-omega-hydroxy-, alkyl ethers, disodium salts; poly(oxy-1,2-ethanediyl), alpha-(3-carboxy-1-oxosulfopropyl)-omega-hydroxy-, alkyl ethers, disodium salts; poly(oxy-1,2-ethanediyl), alpha-(3-carboxy-1-oxo-sulfo-propyl)-omega-hydroxy-, alkyl ethers, disodium salts; poly(oxy-1,2-ethanediyl), alpha-(3-carboxy-1-oxosulfopropyl)-omega-(isotridecyloxy)-, disodium salt; disodium ethoxylated nonylphenol half ester of sulfosuccinic acid; and butanedioic acid, 2-sulfo-, $C_9$- to $C_{11}$-isoalkyl esters, disodium salts which are rich in the $C_{10}$-isoalkyl component; and mixtures of these. The meaning of alkyl in this paragraph can be, independently for each occurrence, a linear or branched or cyclic alkyl group having from four to twenty-four, and preferably, from six to twenty carbon atoms.

The best performance overall, including performance in different media (seawater, seawater plus diesel oil, brine) at different temperatures ranging from a low of about 10° C. over ambient, in this case 23° C., and elevated (more than 23° C.; preferably at least 25° C.; in the examples tested in this case, 80° C.) temperatures was reached with either sulfosuccinamates alone, or with mixtures of sulfosuccinamates with monoester or diester sulfosuccinates. These latter mixtures show a synergy, compared to the use of a sulfosuccinamate alone, or monoester or diester sulfosuccinates alone, i. e. their performance with regard to foam formation, foam stability, and tolerance of salt and the presence of hydrocarbon oil in the aqueous foam-forming surfactant composition, or in contact with hydrocarbon oil or gas, is better than the performance of the components of the mixture in a linear combination. The mass fraction of sulfosuccinamates, based on the sum of the masses of sulfosuccinates and sulfosuccinamates, may be from 0.5% to 99.5%, preferably from 1% to 99%, and with particular preference, from 5% to 95%. The optimum range for these mixtures varies with varying temperature, salinity of the aqueous solution, and the presence, amount and kind of hydrocarbons.

When mixtures of sulfosuccinamates ("SSA") with monoester sulfosuccinates ("MSS") or diester sulfosuccinates ("DSS") are used at ambient temperatures, synergy has been found for mixtures obeying the following relationship:

$$1:99 \leq m(\text{SSA})/[m(\text{MSS}) + m(\text{DSS})] \leq 99:1,$$

in other words, mixtures of one or more sulfosuccinamates with sulfosuccinate monoesters or sulfosuccinate diesters, or their mixtures, having a mass fraction of from 99% to 1% of sulfosuccinamates present in the mixture of these surfactants.

It has proved to be advantageous to use a higher amount of the sulfosuccinamates, such as a mass ratio of $$51:49 \leq m(\text{SSA})/[m(\text{MSS}) + m(\text{DSS})] \leq 95:5.$$

With preference, this ratio is from 65:35 to 90:10, and with particular preference, from 67:33 to 85:15.

It is also possible to combine sulfosuccinamates, or their blends with sulfosuccinates, with other surfactants which are not of the sulfosuccinate or sulfosuccinamate type, such as alkanolamides, alkyl sulfates, alpha-olefin sulfonates, betaines, fatty acid soaps, fatty alcohol alkoxylates, ethoxylated sorbitan esters, and sulfobetaines as mentioned supra.

The optimum concentration of the surfactants in the reservoir, expressed as mass fraction w(SF) of surfactant or surfactant mixture in the foam-forming surfactant composition which consists of the surfactant or surfactant mixtures, and optionally, a liquid vehicle "LV" which is water or an aqueous salt solution or a supercritical gas, which liquid vehicle may also comprise a hydrocarbon oil such as diesel oil, and the surfactant or surfactant mixture, calculated as the ratio of the mass m(SF) of surfactant to the sum of the mass m(LV) of liquid vehicle and the mass m(SF) of surfactant which is equal to the mass m(FC) of the aqueous foam-forming surfactant composition $$w(\text{SF}) = m(\text{SF})/[m(\text{LV}) + m(\text{SF})] = m(\text{SF})/m(\text{FC}),$$

is between 0.05% and 10% (0.5 g/kg to 100 g/kg), preferably between 0.6 g/kg and 80 g/kg, and particularly preferred, between 0.75 g/kg and 70 g/kg.

The foam-forming surfactant composition of this invention can preferably be used as solution in a solvent or liquid vehicle, wherein the solvent is selected from water, aqueous salt solutions, liquefied gases, supercritical gases, and mixtures of these. Typically, the surfactant is incorporated into the aqueous media and a foam is created. If an aqueous salt solution is used as solvent, an aqueous foam-forming surfactant composition is obtained, wherein the combination of the foam-forming surfactant composition and the water or aqueous salt solution preferably comprises a mass fraction of at least 0.2%, and preferably, up to 10%, of dissolved inorganic salts, and foam can be generated therefrom by intimate mixing with a gas in a foam generator. It is also possible to generate a foam in situ through introduction under pressure of alternating slugs of a gas and of the foam-forming surfactant composition into a subterranean oil- or gas-bearing geological formation which, in many cases, also contains water or aqueous salt solutions. The same mass fraction of at least 0.2%, and preferably, up to 10%, of dissolved inorganic salts is usually obtained thereby.

This foam is used for extracting mineral oil or natural gas from these geological formations, by optionally applying pressure to the foam, feeding the foam into a subterranean oil- or gas-bearing geological formation, and by collecting hydrocarbon mineral oil or natural gas driven by the foam in a production well.

Feeding of the foam, or formation of the foam within the hydrocarbon oil- or gas-bearing geological formation, and collection of hydrocarbon oil or gas are preferably conducted at a temperature of from 10° C. to 95° C., more preferred at from 15° C. to 90° C.

When feeding or formation of the foam, and collection of oil or gas are conducted at a temperature of from 10° C. to 95° C., and the surfactant comprises a sulfosuccinamate surfactant and at least one of a monoester sulfosuccinate and a diester sulfosuccinate, the ratio of the mass m(SSA) of sulfosuccinamates to the sum m(MSS)+m(DSS) of the mass m(MSS) of monoester sulfosuccinates and the mass m(DSS) of diester sulfosuccinates is preferably $$20:80 \leq m(SSA)/[m(MSS)+m(DSS)] \leq 95:5.$$

The preferred mass fraction w(SF) of the at least two surfactants present in the forma-forming surfactant composition of this invention, calculated as the ratio of the sum of their masses m(SF) to the mass m(FC) of the aqueous foam-forming surfactant composition, in this collection process is from 0.5 g/kg to 100 g/kg (0.05% to 10%).

When using sulfosuccinamates SSA alone, the same preferred mass fraction of from 0.5 g/kg to 100 g/kg (0.05% to 10%) of sulfosuccinamates in an aqueous foam-forming surfactant composition prepared by dissolving the sulfosuccinamates in water or aqueous salt solution or by in situ foam generation in combination with water or aqueous salt solution present in the subterranean oil- or gas-bearing geological formation is used.

The preferred sulfosuccinamate for hydrocarbon oil and gas recovery is that of formula IV

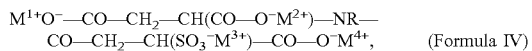
$$M^{1+}O^--CO-CH_2-CH(CO-O^-M^{2+})-NR-CO-CH_2-CH(SO_3^-M^{3+})-CO-O^-M^{4+}, \quad \text{(Formula IV)}$$

where $M^{1+}$, $M^{2+}$, $M^{3+}$, and $M^{4+}$ may be the same or may be different, and are selected from cations of the elements of groups 1 and 2 of the Periodic Table of the Elements, consisting of the alkali metals, and the earth alkali metals, preferably from $Li^+$, $Na^+$, $K^+$, and also from ammonium $NH_4^+$; R is a linear or branched aliphatic radical having from eight to twenty-four carbon atoms, and optionally, one or more carbon-carbon double bonds, or a mixture of two or more of such radicals. With preference, the sulfosuccinamate surfactant is a mixture of the sodium salts of sulfosuccinamate surfactants of Formula IV that comprise mixtures of saturated octadecyl and mono-unsaturated octadecenyl radicals in their molecules as alkyl groups.

In another embodiment, a dispersion including a multiphase mixture of two or more liquid media ("liquid-liquid dispersion", comprising a continuous liquid phase, and at least one discontinuous "dispersed" liquid phase, also referred to as "emulsion") and a multiphase mixture of at least one liquid medium and at least one gaseous medium (liquid-gas dispersion", comprising a continuous liquid phase and at least one gaseous phase, also referred to as "foam") can be formed by mixing. Embodiments include forming an emulsion of the multiphase mixture, of the supercritical carbon dioxide and the surfactant, in water within the oil containing reservoir to control mobility of the supercritical carbon dioxide in the oil containing reservoir. As used herein, the term "emulsion" also refers to a system in which a liquid and/or droplets of a supercritical fluid are dispersed in a liquid. It is understood that in certain embodiments, carbon dioxide can exist as a gas, liquid, or supercritical fluid depending on the temperature and pressure.

Carbon dioxide is much less viscous than oil or water, and may therefore move faster in some regions and directions in a geological formation than in others to create so-called "viscous fingers" through which a significant portion of the injected fluids may flow. Some of these fingers may arrive prematurely at a production well; lowering the effectiveness of both the injected carbon dioxide and of the production well's pumping capacity. Additionally, gravity separation of the water and carbon dioxide can result in gravity override, where the more dense water flows or resides in a lower zone of the oil-containing reservoir and the less dense carbon dioxide flows or resides in an upper zone of the oil-containing reservoir. The foam or emulsion helps to reduce viscous fingering and/or gravity override that may result, at least in part, due to the relative lower viscosity and density of the carbon dioxide.

Moreover, since fluids flow preferentially into areas of high permeability in the oil containing reservoir, the foam or emulsion may greatly increase local resistance to flow in the more permeable regions, thereby diverting injected fluids to areas of lower permeability and improving sweep efficiency for the oil recovery throughout a greater portion of the oil containing reservoir.

In one or more embodiments, the emulsion or foam may be formed in situ by shear flow. For example, the emulsion or foam may be formed from shear flow occurring within the oil containing reservoir. The emulsion can have a degree of stability for the oil recovery over varying conditions associated with the oil containing reservoir, including, but not limited to, temperature, pressure, and chemical conditions in the oil or gas-containing reservoir. The emulsion can propagate throughout the oil or gas-containing reservoir, for example via an emulsion front.

In some embodiments, the foam-forming surfactant composition of this invention may be added to supercritical carbon dioxide which is applied to an oil-containing reservoir, where previously, supercritical carbon dioxide without surfactant was added to the oil-containing reservoir in an alternating sequence with water injection (a process sometimes known as a WAG, water alternating gas, cycle). Due to the fingering or channelling for carbon dioxide, as discussed hereinabove, regions with high permeability would likely have been swept more thoroughly or preferentially during the prior surfactant-free carbon dioxide process. Regions with low permeability would thus still contain more recoverable oil due to the less efficient prior application of carbon dioxide. Addition of a foam-forming surfactant composition will improve the yield of the recovery process in zones which were poorly swept by the application of the common carbon dioxide (surfactant-free)/water cycles alone.

In addition to the foam-forming surfactant composition which is the subject of this invention, there can also be included foam stabilisers, foam boosters, pour point depressants and other common ingredients.

Besides the applications in oil and gas recovery as described supra, the foam-forming surfactant composition which is the subject of this invention can also be used in other oil industry applications for foams including drilling fluids and stimulation, such as described in U.S. Pat. No. 7,842,650 B2 which relates to the usage of foams in drilling fluids to reduce hydrostatic pressure and increase oil and gas recovery, and in U.S. Pat. No. 5,614,473 A which relates to the use of foamable compositions in direct drilling, fracturing, enhanced oil recovery, and combinations thereof.

Other than in recovery of oil and gas, the foam-forming surfactant compositions of the present invention can likewise be used, advantageously, for personal care applications, cleaning applications, foam insulation, carpet backing, cement, wall board, polymers, and fire-fighting foams, because of their high foaming capability, their resistance to oil and fats, and their thermal and chemical stability.

In accordance with the above, the invention includes at least the following embodiments:

Embodiment 1

A foam-forming surfactant composition comprising at least two surfactants whereof at least one is a sulfosuccinamate, and at least one is a sulfosuccinate.

Embodiment 2

A foam-forming surfactant composition according to embodiment 1 further comprising a solvent selected from the group consisting of water, aqueous salt solutions, liquefied gases, supercritical gases, and mixtures thereof.

Embodiment 3

The foam-forming surfactant composition of embodiment 1 or of embodiment 2 wherein the mass fraction w(SF) of the at least two surfactants, calculated as the ratio of the sum of their masses m(SF) to the mass m(FC) of the foam-forming surfactant composition, is from 0.5 g/kg to 100 g/kg.

Embodiment 4

The foam-forming surfactant composition of any one of embodiments 1 to 3 wherein the sulfosuccinamate surfactant is represented by the formula R—NX—CO—CHY$^1$—CHY$^2$—CO—O$^-$M$^{4+}$, (Formula I)

where Y$^1$ is H and Y$^2$ is (SO$_3^-$M$^{3+}$), or Y$^1$ is (SO$_3^-$M$^{3+}$) and Y$^2$ is H,
M$^{3+}$ and M$^{4+}$ may be the same or different, and each is independently selected from the group consisting of the cations of the chemical elements of groups 1 and 2 of the Periodic Table of the Elements, consisting of the alkali metals, and the earth alkali metals, and from ammonium NH$_4^+$; R is a linear or branched or cyclic aliphatic radical having from four to twenty-four carbon atoms;
X is chosen from a hydrogen atom, or an alkylcarboxylate group —(CR$^a$R$^b$)—COO$^-$M$^{2+}$ where R$^a$ and R$^b$ may both be H, or R$^a$ is H and R$^b$ is —CH$_2$—COO$^-$ M$^{1+}$, where M$^{1+}$ and M$^{2+}$ may be the same or different, and each is independently selected from the group consisting of the cations of the chemical elements of groups 1 and 2 of the Periodic Table of the Elements, consisting of the alkali metals, and the earth alkali metals, and from ammonium NH$_4^+$.

Embodiment 5

The foam-forming surfactant composition of any one of embodiments 1 to 4 wherein the sulfosuccinate surfactant is a sulfosuccinate diester represented by the formula R$^{1\prime}$—O—CO—CHY$^3$—CHY$^4$—CO—O—R$^2$, (Formula III)

where
Y$^3$ is H and Y$^4$ is (SO$_3^-$M$^+$), or Y$^3$ is (SO$_3^-$M$^+$) and Y$^4$ is H,
both R$^1$ and R$^2$ may be the same or different, and each is independently selected from the group consisting of linear or branched or cyclic aliphatic radicals having from four to twenty-four carbon atoms, and
M$^+$ is selected from the group consisting of the cations of the chemical elements of groups 1 and 2 of the Periodic Table of the Elements, consisting of the alkali metals, and the earth alkali metals, and from ammonium NH$_4^+$.

Embodiment 6

The foam-forming surfactant composition of any one of embodiments 1 to 4 wherein the sulfosuccinate surfactant is a sulfosuccinate monoester represented by the formula R$^1$—O—CO—CHY$^3$—CHY$^4$—CO—O—R$^2$, (Formula III)

where
Y$^3$ is H and Y$^4$ is (SO$_3^-$M$^+$), or Y$^3$ is (SO$_3^-$M$^+$) and Y$^4$ is H,
one of R$^1$ and R$^2$ may be selected from the group consisting of linear or branched or cyclic aliphatic radicals having from four to twenty-four carbon atoms, and the other of R$^1$ and R$^2$ is a hydrogen atom or an alkali metal selected from the group consisting of the cations of the chemical elements of groups 1 and 2 of the Periodic Table of the Elements, consisting of the alkali metals, and the earth alkali metals, and from ammonium NH$_4^+$, and
M$^+$ is selected from the group consisting of the cations of the chemical elements of groups 1 and 2 of the Periodic Table of the Elements, consisting of the alkali metals, and the earth alkali metals, and from ammonium NH$_4^+$.

Embodiment 7

The foam-forming surfactant composition of any one of embodiments 1 to 6 wherein the sulfosuccinamate is selected from the group consisting of
compounds of the formula R—NX—CO—CHY$^1$—CHY$^2$—CO—O$^-$M$^{4+}$ (Formula I)

where
Y$^1$ is H and Y$^2$ is (SO$_3^-$M$^{3+}$), or Y$^1$ is (SO$_3^-$M$^{3+}$) and Y$^2$ is H,
M$^{3+}$ and M$^{4+}$ may be the same or different, and each is independently selected from the group consisting of the cations of the chemical elements of groups 1 and 2 of the Periodic Table of the Elements, consisting of the alkali metals, and the earth alkali metals, and from ammonium NH$_4^+$;
R is a linear or branched or cyclic aliphatic radical having from four to twenty-four carbon atoms, and
X is H, and
compounds of the formula R—NX—CO—CHY$^1$—CHY$^2$—CO—O$^-$M$^{4+}$, (Formula I)

where
Y$^1$ is H and Y$^2$ is (SO$_3^-$M$^{3+}$), or Y$^1$ is (SO$_3^-$M$^{3+}$) and Y$^2$ is H,
R is a linear or branched or cyclic aliphatic radical having from four to twenty-four carbon atoms, and
X is an alkyl-dicarboxylate group —CH[—CH$_2$—COO$^-$ M$^{1+}$]—COO$^-$M$^{2+}$;
where M$^{1+}$ and M$^{2+}$ and M$^{3+}$ and M$^{4+}$ may be the same or different, and each is independently selected from the group consisting of the cations of the chemical elements of groups 1 and 2 of the Periodic Table of the Elements, consisting of the alkali metals, and the earth alkali metals, and from ammonium $NH_4^+$.

Embodiment 8

The foam-forming surfactant composition of any one of embodiments 1 to 7, wherein the sulfosuccinate is selected from the group consisting of monoester sulfosuccinates having polyoxyethylene moieties in their molecules, and from the group of diester sulfosuccinates having branched saturated alkyl groups $R^1$ and $R^2$ of from four to eight carbon atoms.

Embodiment 9

The foam-forming surfactant composition of any one of embodiments 1 to 8 which comprises a sulfosuccinamate surfactant and at least one of a monoester sulfosuccinate and a diester sulfosuccinate, wherein the ratio of the mass m(SSA) of sulfosuccinamates ("SSA") to the sum of the mass m(MSS) of monoester sulfosuccinates ("MSS") and the mass m(DSS) of diester sulfosuccinates ("DSS") is 1:99≤m(SSA)/[m(MSS)+m(DSS)]≤99:1.

Embodiment 10

The foam-forming surfactant composition of any one of embodiments 1 to 9 which comprises a sulfosuccinamate surfactant and at least one of a monoester sulfosuccinate and a diester sulfosuccinate, wherein the sulfosuccinamate is

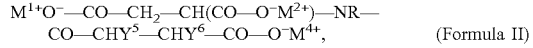

$M^{1+}O^-$—CO—$CH_2$—CH(CO—$O^-M^{2+}$)—NR—CO—$CHY^5$—$CHY^6$—CO—$O^-M^{4+}$,　　(Formula II)

$Y^5$ is H and $Y^6$ is ($SO_3^-M^{3+}$), or $Y^5$ is ($SO_3^-M^{3+}$) and $Y^6$ is H, $M^{1+}$, $M^{2+}$, $M^{3+}$, and $M^{4+}$ may be the same or different, and each is independently selected from the group consisting of the cations of the chemical elements of groups 1 and 2 of the Periodic Table of the Elements, consisting of the alkali metals, and the earth alkali metals, and from ammonium $NH_4^+$; R is a linear or branched or cyclic aliphatic radical having from four to twenty-four carbon atoms.

Embodiment 11

The foam-forming surfactant composition of any one of embodiments 4 to 10, wherein the cations of the sulfosuccinamate surfactant are independently selected from the group consisting of $Li^+$, $Na^+$, and $K^+$.

Embodiment 12

The foam-forming surfactant composition of embodiment 11 wherein in the sulfosuccinamate surfactant, all cations are sodium cations, $Na^+$.

Embodiment 13

The foam-forming surfactant composition of any one of embodiments 4 to 12, wherein when R of Formula (I), R of Formula (II), R1 of Formula (III), or R2 of Formula (III) is selected from the group consisting of linear or branched or cyclic aliphatic radicals having from four to twenty-four carbon atoms, said radical includes one or more carbon-carbon double bond or a mixture of two or more of said radicals.

Embodiment 14

The foam-forming surfactant composition of embodiment 13 wherein the sulfosuccinamate surfactant is a mixture of the sodium salts of sulfosuccinamate surfactants that have mixtures of saturated octadecyl and mono-unsaturated octadecenyl radicals in their molecules as alkyl groups.

Embodiment 15

A method of recovering oil or gas from a subterranean oil- or gas-bearing geological formation comprising the following steps:
　　generating a foam,
　　feeding the foam into a subterranean oil- or gas-bearing geological formation, and
　　collecting mineral oil or natural gas driven by the foam in a production well,
wherein the foam is generated by
　　intimate mixing of the foam-forming surfactant composition of any of embodiments 1 to 14 with a gas in a foam generator,
or by
　　introduction of at least one of water and gases, together or intermittently or in alternating sequence, slugs of a gas which may be in a supercritical or non-supercritical state, and of water, wherein the foam-forming surfactant composition of any of embodiments 1 to 14 can be admixed to the water or to the gas if the gas is in a supercritical state or be introduced separately as solution into a subterranean oil- or gas-bearing geological formation.

Embodiment 16

The method of embodiment 15, wherein the feeding of the foam and collection are conducted at a temperature of from 10° C. to 95° C., and the surfactant comprises a sulfosuccinamate surfactant and at least one of a monoester sulfosuccinate and a diester sulfosuccinate, wherein the ratio of the mass m(SSA) of sulfosuccinamates to the sum m(MSS)+m(DSS) of the mass m(MSS) of monoester sulfosuccinates and the mass m(DSS) of diester sulfosuccinates is 20:80≤m(SSA)/[m(MSS)+m(DSS)]≤95:5.

Embodiment 17

The method of any one of embodiments 15 to 16, wherein the mass fraction w(SF) of the at least two surfactants present in the composition of any one of embodiments 1 to 14, calculated as the ratio of the sum of their masses m(SF) to the mass m(FC) of the aqueous foam-forming surfactant composition, is from 0.5 g/kg to 100 g/kg.

Embodiment 18

A method of recovering oil or gas from a subterranean oil- or gas-bearing geological formation comprising the following steps:
　　generating a foam,
　　feeding the foam under pressure into a subterranean oil- or gas-bearing geological formation, and
　　collecting mineral oil or natural gas driven by the foam in a production well,
wherein the foam is generated from a foam-forming surfactant composition comprising a solvent which is preferably water, and a sulfosuccinamate surfactant represented by the formula

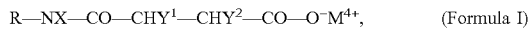

$$R—NX—CO—CHY^1—CHY^2—CO—O^-M^{4+}, \quad \text{(Formula I)}$$

where $Y^1$ is H and $Y^2$ is $(SO_3^-M^{3+})$, or $Y^1$ is $(SO_3^-M^{3+})$ and $Y^2$ is H,
where $M^{3+}$ and $M^{4+}$ may be the same or different, and each is independently selected from the group consisting of the cations of the chemical elements of groups 1 and 2 of the Periodic Table of the Elements, consisting of the alkali metals, and the earth alkali metals, and from ammonium $NH_4^+$; R is a linear or branched aliphatic radical having from eight to twenty-four carbon atoms, and optionally, one or more carbon-carbon double bonds, or a mixture of two or more of such radicals; and X is a hydrogen atom, or an alkylcarboxylate group $—(CR^aR^b)—COO^-M^{2+}$ where $R^a$ and $R^b$ are both H, or $R^a$ is H and $R^b$ is $—CH_2—COO^-M^{1+}$, where $M^{1+}$ and $M^{2+}$ may be the same or different, and each is independently selected from the group consisting of the cations of the chemical elements of groups 1 and 2 of the Periodic Table of the Elements, consisting of the alkali metals, and the earth alkali metals, and from ammonium $NH_4^+$, by
  intimate mixing of the said foam-forming surfactant composition with a gas in a foam generator,
or by
  introduction of at least one of water and gases, together or intermittently or in alternating sequence, slugs of a gas which may be in a supercritical or non-supercritical state, and of water, wherein the said foam-forming surfactant composition can be admixed to the water or to the gas if the gas is in a supercritical state or be introduced separately as solution into a subterranean oil- or gas-bearing geological formation.

Embodiment 19

The method of embodiment 18, wherein the mass fraction w(SF) of the sulfosuccinamate surfactant, calculated as the ratio of the sum of the mass m(SF) of the sulfosuccinamate surfactant to the mass m(FC) of the foam-forming surfactant composition, is from 0.5 g/kg to 100 g/kg.

Embodiment 20

The method of embodiment 18 or of embodiment 19 wherein the sulfosuccinamate is

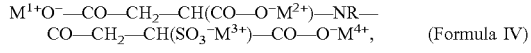

$$M^{1+}O^-—CO—CH_2—CH(CO—O^-M^{2+})—NR— \\ CO—CH_2—CH(SO_3^-M^{3+})—CO—O^-M^{4+}, \quad \text{(Formula IV)}$$

where $M^{1+}$, $M^{2+}$, $M^{3+}$, and $M^{4+}$ may be the same or different, and each is independently selected from the group consisting of the cations of the chemical elements of groups 1 and 2 of the Periodic Table of the Elements, consisting of the alkali metals, and the earth alkali metals, and from ammonium $NH_4^+$; R is a linear or branched aliphatic radical having from eight to twenty-four carbon atoms, and optionally, one or more carbon-carbon double bonds, or a mixture of two or more of such radicals.

Embodiment 21

The method of any of embodiments 18 to 20 wherein the sulfosuccinamate surfactant is a mixture of the sodium salts of sulfosuccinamate surfactants that comprise mixtures of saturated octadecyl and mono-unsaturated octadecenyl radicals in their molecules as alkyl groups.

Embodiment 22

The method of any one of embodiments 15 to 21, wherein the temperature of the subterranean oil- or gas-bearing geological formation is at least 25° C.

Embodiment 23

The method of any one of embodiments 15 to 22, wherein the foam-forming surfactant composition, or the water present in the subterranean oil- or gas-bearing geological formation, or both, also comprises a mass fraction of at least 0.2% of dissolved inorganic salts.

EXAMPLES

The invention is further illustrated by the following examples of foam-forming compositions according to the invention, which are provided to assist those skilled in the art to further understand certain embodiments of the present invention. These examples are intended for illustration purposes and are not to be construed as limiting the scope of the appended claims.

The following materials have been used in these experiments:
  for simulated seawater, Red Sea Salt has been purchased from Red Sea Corporation; this salt mixture was fully dissolved under stirring for at least thirty minutes in deionised water to a mass concentration of salts of 38.3 g/l; the solution which is referred to as "seawater", had a pH of 8.3±0.1, and ion mass concentrations $\gamma(Ca^{++})=(430\pm10)$ mg/l, $\gamma(Na^+)=(10.8\pm0.1)$ g/l, $\gamma(Mg^{++})=(1280\pm30)$ mg/l, and $\gamma(K^+)=(390\pm30)$ mg/l, for calcium, sodium, magnesium and potassium ions;
  the diesel oil was an automotive grade purchased from GS Caltex of Korea with a pour point of below 0° C., a kinematic viscosity of from 1.9 mm²/s to 5.5 mm²/s, a distillation temperature of less than 360° C., a cetane index of more than 52, determined according to ASTM D 4737=ISO 4264, a mass fraction of polycyclic aromatic hydrocarbons of less than 5%, a mass fraction of aromatic hydrocarbons of less than 30%, and a volume fraction of fatty acid methyl esters of less than 5%;
  the mixtures of seawater as explained above, and diesel oil (mass fraction of water of 90%, and mass fraction of diesel oil of 10%, referred to as "seawater-diesel" hereinafter) were prepared by mixing 225 g of seawater with 25 g of diesel oil;
  the solutions containing surfactant were prepared by charging the desired mass of surfactant to a 250 ml flask, and adding the seawater, or seawater-diesel liquid mixtures in the required mass to obtain solutions having a mass fraction of surfactant of 0.1% or 0.5%, and mixing for at least thirty minutes.

In these tests, the mixtures of seawater and diesel oil used as solvent or liquid medium simulate the combined effect of hydrocarbons and salt solution, close to field application conditions.

Foams were prepared in all cases by mixing 250 ml in each case of the aqueous solutions containing the desired kind and amount of surfactants in a Waring Lab Blender model 34BL99 at high shear rate of 14 400 min$^{-1}$ for thirty seconds. The solutions and foams were then transferred to graduated cylinders of 1000 ml volume, and the foam height and stability were measured over up to sixty minutes. Foam heights were read at the graduation, and comprise the sum of liquid and foam volume, and recorded at the start (0 min) and then at 60 min, the values stated are in milliliters (ml). When the foam was completely settled, i. e., no foam remaining, the remaining volume was that of the liquid, 250 ml.

The following surfactants have been used in these examples:

A aspartic acid, N-(3-carboxy-1-oxosulfopropyl)-N-tallow alkyl derivatives, tetrasodium salt, also known as tetrasodium N-(1,2-dicarboxyethyl)-N-alkyl/alkenyl sulfosuccinamate, CAS No. 867040-07-1; where N-alkyl/alkenyl group also referred to as tallow alkyl is derived from tallow amine; tallow alkyl is the common name for a mixture comprising octadecenyl, hexadecyl, octadecyl, tetradecyl, octadecenediyl, hexadecenyl, and octadecenetriyl groups, as derived from e. g., beef tallow C poly(oxy-1,2-ethanediyl), α-(3-carboxy-1-oxosulfopropyl)-ω-hydroxy-, $C_{10}$-$C_{16}$-alkyl ethers, disodium salt, CAS No. 68815-56-5

D ethoxylated nonylphenol half ester of sulfosuccinic acid disodium salt, CAS No. 9040-38-4

E Mixture of butanedioic acid, 2-sulfo-, $C_{9-11}$-isoalkyl esters, $C_{10}$-rich, disodium salt, CAS No. 815583-91-6; poly(oxy-1,2-ethanediyl), α-(3-carboxy-1-oxosulfopropyl)-ω-hydroxy-, C12-14-alkyl ethers, disodium salts, CAS No. 1024612-24-5; and poly(oxy-1,2-ethanediyl), α-(3-carboxy-1-oxosulfopropyl)-ω-hydroxy-, C10-12-alkyl ethers, disodium salts, CAS 68954-91-6

F poly(oxy-1,2-ethanediyl), α-(3-carboxy-1-oxosulfo-propyl)-ω-(isotridecyloxy)-, sodium salt (1:2), CAS No. 1013906-64-3

G disodium ($C_{9-11}$-isoalkyl, $C_{10}$-rich) sulfosuccinate, CAS No. 815583-91-6

H sodium diisobutyl sulfosuccinate, CAS No. 127-39-9

J sodium di(1,3-dimethylbutyl) sulfosuccinate, CAS No. 2373-38-8

L sodium dioctylsulfosuccinate, CAS No. 577-11-7

N cocoamidopropyl betaine, CAS No. 61789-40-0, mainly consisting of {[3-(dodecanoylamino)propyl](dimethyl) ammonio}acetate (commercially available from Stepan Company, Northfield, Ill. under the trade name Petrostep® CG-50, has been recommended for a variety of foaming applications in oilfield solutions)

O sodium alpha-olefin sulfate where the alpha-olefin has from fourteen to sixteen carbon atoms, CAS No. 68439-57-6 (commercially available from Stepan Company, Northfield, Ill. under the trade name Bioterge® AS-40, has been recommended, i. a.
as a drilling foamer in oilfield applications)

Commercial surfactants N and O have been included as comparative products.

Example 1

Foams have been made from a mixture of seawater and surfactants and mixing in a laboratory blender as described supra, these mixtures having mass fractions of 0.1% (1 g/kg) of sulfosuccinamate surfactant: A
monoester sulfosuccinate surfactants: C; D; E; F;
diester sulfosuccinate surfactants: J; L;
and comparative surfactants N; O;

and as comparative test, pure seawater has been used without addition of surfactants, and foam formation has been tested at 23° C. The results are compiled in Table 1.

TABLE 1

Foam Height for Single Surfactants
(volume reading in ml; medium = seawater, 23° C.)

| | Surfactant | | | | | | | | |
|---|---|---|---|---|---|---|---|---|---|
| | A | C | D | E | F | J | L | N | O | none |
| after 60 min | 680 | 515 | 490 | 370 | 345 | 250 | 260 | 280 | 520 | 250 |

It can be seen that surfactant A, a sulfosuccinamate surfactant, behaves best in the foam height.

In a further test, mixtures of surfactant A with sulfosuccinate surfactants were tested in mixture with seawater. Foams have been made from a mixture of seawater and surfactants mixture, by mixing in a laboratory blender as described supra, these mixtures having a sum of mass fractions of surfactants w(A)+w(X) of 0.1% (1 g/kg), of sulfosuccinamate surfactant A with mass fraction w(A)=m(A)/m(mixture), sulfosuccinate surfactant X (in this example, X stands for E or J which were tested in mixture with A) with mass fraction w(X)=m(X)/m(mixture), where m(A) is the mass of surfactant A, m(X) is the mass of surfactant E or J, and m(mixture) is the mass of the mixture of seawater and both surfactants, in mass ratios m(A)/m(X) of 90:10, 75:25, 60:40, and 25:75, and foam stability has been tested at 23° C.

The following results were obtained and compiled in Table 2:

TABLE 2

Foam Height for Surfactant Mixtures; mass fractions of components in %,
(volume reading in ml; medium = seawater, 23° C.)

| Surfactants | 100 A | 90 A + 10 E | 75 A + 25 E | 60 A + 40 E | 25 A + 75 E | 100 E | 100 A | 75 A + 25 J | 100 J |
|---|---|---|---|---|---|---|---|---|---|
| after 60 min | 680 | 690 | 740 | 670 | 440 | 370 | 680 | 690 | 250 |

It can be seen that there is a synergy between surfactants A and E in the region of mass fractions of from 90% of A+10% of E until 25% of A and 75% of E in the surfactant mixtures because the foam height using the surfactant mixtures is higher than that when using the components of the surfactant alone, or the linear combination of the effects of the components. In mixtures of A and J, synergy could also be shown for the only tested combination of mass fractions of 75% of A and 25% of J, which is particularly surprising as the volume reading for surfactant J alone was 250 ml, which corresponds to the volume of the liquid, and no foam. This favourable behaviour could not have been expected by a person ordinarily skilled in the art.

A further test for synergy was made with mixtures of surfactant A (75%) and surfactants E, H, and J (25% in each case, corresponding to a mass ratio m(A)/m(X)=3 kg/1 kg, where X is E, H or J), dissolved in seawater with a total surfactant concentration of 0.1% (1 g/kg). The following results were obtained and are compiled in Table 3:

TABLE 3

Foam Height for Surfactant Mixtures; mass fractions of components in %,
(volume reading in ml; medium = seawater, 23° C.)

| Surfactants | 100 A | 75 A + 25 E | 75 A + 25 H | 75 A + 25 J |
|---|---|---|---|---|
| after 60 min | 680 | 740 | 790 | 690 |

As already found in the concentration study, good synergy is obtained with 3:1 mixtures of sulfosuccinamate surfactant A with sulfosuccinate surfactants E, H, and J. The best result was found for the combination of A with H.

Example 2

The tests of Example 1 have been made with a higher total surfactant concentration of 0.5% (mass fraction of surfactant in the solution with seawater: 5 g/kg).

Surfactant A was compared to the commercial products, surfactants N and O, and foam height was tested at 23° C. in seawater.

The following results were obtained and compiled in Table 4:

TABLE 4

Foam Height for Single Surfactants
(volume reading in ml; medium = seawater, 23° C.)

| Surfactant | A | N | O | none |
|---|---|---|---|---|
| after 60 min | 760 | 320 | 500 | 250 |

It can be seen that the sulfosuccinamate surfactant A has the best foam height, compared to the commercial products.

When the test with mixed surfactants was conducted at a higher surfactant concentration (the sum of the mass fractions of surfactants in the seawater solution was 0.5%, or 5 g/kg), the synergy was even more marked than in Example 1, as demonstrated by the results compiled in Table 5:

TABLE 5

Foam Height for Surfactant Mixtures; mass fractions of components in %,
(volume reading in ml; medium = seawater, 23° C.)

| Surfactant | 100 A | 75 A + 25 E | 75 A + 25 J |
|---|---|---|---|
| after 60 min | 760 | 940 | 900 |

In both cases, when 25% of A was substituted by the same mass of sulfosuccinate surfactants E or J, foam height of 900 ml or more was obtained in these synergistic mixtures, compared to the foam height of 760 ml for A alone.

Example 3

Foams have been made from a mixture of seawater with diesel oil (mass fraction of water of 90%, and mass fraction of diesel oil of 10%; prepared by mixing 225 g of seawater with 25 g of diesel oil) and surfactants, and mixing in a laboratory blender as described supra, these mixtures having mass fractions of 0.1% (1 g/kg) of
sulfosuccinamate surfactant: A
monoester sulfosuccinate surfactants: C; D; E; F; G;
diester sulfosuccinate surfactants: J;
and comparative surfactants N; O;
and as comparative test, the seawater-diesel oil mixture has been used without addition of surfactants, and foam formation has been tested at 80° C. The results are compiled in Table 6.

TABLE 6

Foam Height for Single Surfactants
(volume reading in ml; medium = seawater/diesel, 80° C.)

| | Surfactant | | | | | | | | |
|---|---|---|---|---|---|---|---|---|---|
| | A | C | D | E | F | G | J | N | O | none |
| after 60 min | 310 | 260 | 260 | 260 | 260 | 250 | 260 | 250 | 250 | 250 |

It can be seen that surfactant A, a sulfosuccinamate surfactant, behaves best in the foam height. All other surfactants show no satisfactory foam formation under these conditions, i. e. very little or no effect, compared to the zero test (no surfactant).

A further test for synergy was made with mixtures of surfactant A (75%) and surfactants E, F, and H (25% in each case, corresponding to a mass ratio m(A)/m(X)=3 kg/1 kg, where X is E, F, or H), dissolved in seawater-Diesel oil mixture as detailed supra, with a total surfactant concentration of 0.1% (1 g/kg). The following results were obtained and compiled in Table 7:

TABLE 7

Foam Height for Surfactant Mixtures; mass fractions of components in %, (Volume reading in ml; Medium = seawater/diesel, 80° C.)

| Surfactants | 100 A | 75 A + 25 E | 75 A + 25 F | 75 A + 25 H |
|---|---|---|---|---|
| after 60 min | 310 | 330 | 320 | 320 |

As already discovered in Examples 1 and 2, synergy was also obtained under these more severe conditions with 3:1 mixtures of sulfosuccinamate surfactant A with sulfosuccinate surfactants E, F, and H.

Example 4

Tests as in Example 3 have been made with a higher total surfactant concentration of 0.5% (mass fraction of surfactant in the solution: 5 g/kg).

Surfactant A was compared to the commercial product, surfactant N, and foam height was tested at 80° C. in mixtures of seawater and Diesel oil (mass fraction of seawater of 90%, and mass fraction of Diesel oil of 10%; prepared by mixing 225 g of seawater with 25 g of Diesel oil).

The following results were obtained and compiled in Table 8:

TABLE 8

Foam Height for Single Surfactants (volume reading in ml; medium = seawater/diesel, 80° C.)

| Surfactant | A | N | none |
|---|---|---|---|
| after 60 min | 340 | 250 | 250 |

It can be seen that only sulfosuccinamate surfactant A had formed a satisfactory foam under these conditions, while no foam was formed with the commercial product tested.

When a test with mixed surfactants was conducted at the higher surfactant concentration (the sum of the mass fractions of surfactants in the seawater-diesel solution was 0.5%, or 5 g/kg), the following results were obtained and compiled in Table 9:

TABLE 9

Foam Height for Surfactant Mixtures; mass fractions of components in %, (volume reading in ml; medium = seawater/diesel, 80° C.)

| Surfactant | 100 A | 75 A + 25 E | 75 A + 25 J |
|---|---|---|---|
| after 60 min | 340 | 440 | 1000 |

In both cases, when 25% of A was substituted by the same mass of sulfosuccinate surfactants E or J, markedly increased foam height was obtained in these synergistic mixtures, in the case of surfactant J admixed to A to almost threefold. This is particularly surprising for a person ordinarily skilled in the art and could not be considered predictable, as surfactant J alone had only very little foam forming effect under these harsh conditions.

As used herein, the terms "a" and "an" do not denote a limitation of quantity, but rather the presence of at least one of the referenced items. Recitation of ranges of values are merely intended to serve as a shorthand method of referring individually to each separate value falling within the range, and each separate value is incorporated into this specification as if it were individually recited. Thus each range disclosed herein constitutes a disclosure of any sub-range falling within the disclosed range. Disclosure of a narrower range or more specific group in addition to a broader range or larger group is not a disclaimer of the broader range or larger group. All ranges disclosed herein are inclusive of the endpoints, and the endpoints are independently combinable with each other. "Comprises" as used herein includes embodiments "consisting essentially of" or "consisting of" the listed elements.

Although the foregoing description has shown, described, and pointed out the fundamental novel features of certain embodiments of the present invention, it will be understood that various omissions, substitutions, and changes in the form of the detail of the invention as described may be made by those skilled in the art, without departing from the spirit and scope of the present teachings. Consequently, the scope of the present invention should not be limited to the foregoing examples, description or discussion.

We claim:

1. A foam-forming surfactant composition comprising at least one sulfosuccinamate surfactant compound of formula:

$$R-NX-CO-CHY^1-CHY^2-CO-O^-M^{4+}, \qquad \text{(Formula I)},$$

where
$Y^1$ is H and $Y^2$ is $(SO_3^-M^{3+})$, or $Y^1$ is $(SO_3^-M^{3+})$ and $Y^2$ is H, R is a linear or branched or cyclic aliphatic radical having from four to twenty-four carbon atoms, and X is an alkylcarboxylate group $-(CR^aR^b)-COO^-M^{2+}$ where $R^a$ and $R^b$ may both be H, or one of $R^a$ or $R^b$ is H and the other is $-CH_2-COO^-M^{1+}$, where $M^{1+}$ and $M^{2+}$ and $M^{3+}$ and $M^{4+}$ may be the same or different, and each is independently selected from the group consisting of the cations of the chemical elements of groups 1 and 2 of the Periodic Table of the Elements, consisting of the alkali metals, and the earth alkali metals, and from ammonium $NH_4^+$; and at least one monoester sulfosuccinate surfactant compound of formula $$R^1-O-CO-CHY^3-CHY^4-CO-O-R^2, \qquad \text{(Formula III)},$$

where
$Y^3$ is H and $Y^4$ is $(SO_3^-M^+)$, or $Y^3$ is $(SO_3^-M^+)$ and $Y^4$ is H;

one of $R^1$ and $R^2$ may be selected from the group consisting of linear or branched or cyclic aliphatic radicals having from four to twenty-four carbon atoms, and the other of $R^1$ and $R^2$ is a hydrogen atom or an alkali metal selected from the group consisting of the cations of the chemical elements of groups 1 and 2 of the Periodic Table of the Elements, consisting of the alkali metals, and the earth alkali metals, and from ammonium $NH_4^+$, and $M^+$ is selected from the group consisting of the cations of the chemical elements of groups 1 and 2 of the Periodic Table of the Elements, consisting of the alkali metals, and the earth alkali metals, and from ammonium $NH_4^+$.

2. A foam-forming surfactant composition according to claim 1 further comprising a solvent selected from the group consisting of water, aqueous salt solutions, liquefied gases, supercritical gases, and mixtures thereof.

3. The foam-forming surfactant composition of claim 1, wherein the mass fraction w(SF) of the surfactants, calculated as the ratio of the sum of their masses m(SF) to the mass m(FC) of the foam-forming surfactant composition, is from 0.5 g/kg to 100 g/kg.

4. The foam-forming surfactant composition of claim 1, further comprising a diester sulfosuccinate surfactant represented by the formula $$R^1\text{—O—CO—CHY}^3\text{—CHY}^4\text{—CO—O—R}^2, \quad \text{(Formula III)}$$

where
$Y^3$ is H and $Y^4$ is $(SO_3^-M^+)$, or $Y^3$ is $(SO_3^-M^+)$ and $Y^4$ is H;
both $R^1$ and $R^2$ may be the same or different, and each is independently selected from the group consisting of linear or branched or cyclic aliphatic radicals having from four to twenty-four carbon atoms, and
$M^+$ is selected from the group consisting of the cations of the chemical elements of groups 1 and 2 of the Periodic Table of the Elements, consisting of the alkali metals, and the earth alkali metals, and from ammonium $NH_4^+$.

5. The foam-forming surfactant composition of claim 4, wherein
each of $R^1$ and $R^2$ is selected from a branched saturated alkyl group having from four to eight carbon atoms.

6. The foam-forming surfactant composition of claim 1, wherein
X is an alkyl-dicarboxylate group —CH[—CH$_2$—COO$^-$M$^{1+}$]—COO$^-$M$^{2+}$.

7. The foam-forming surfactant composition of claim 1, wherein the monoester sulfosuccinate is selected from the group consisting of monoester sulfosuccinates having polyoxyethylene moieties in their molecules.

8. The foam-forming surfactant composition of claim 4, wherein the ratio of the mass m(SSA) of sulfosuccinamates ("SSA") to the sum of the mass m(MSS) of monoester sulfosuccinates ("MSS") and the mass m(DSS) of diester sulfosuccinates ("DSS") is 1:99≤m(SSA)/[m(MSS)+m(DSS)]≤99:1.

9. The foam-forming surfactant composition of claim 1, wherein the cations of the sulfosuccinamate surfactant are independently selected from the group consisting of Li$^+$, Na$^+$, and K$^+$.

10. The foam-forming surfactant composition of claim 9 wherein in the sulfosuccinamate surfactant, all cations are sodium cations, Na$^+$.

11. The foam-forming surfactant composition of any one of claims 1-3, 4, 6, and 7, wherein when R of Formula (I), R of Formula (II), $R^1$ of Formula (III), or $R^2$ of Formula (III) is selected from the group consisting of linear or branched or cyclic aliphatic radicals having from four to twenty-four carbon atoms, said radical includes one or more carbon-carbon double bond or a mixture of two or more of said radicals.

12. The foam-forming surfactant composition of claim 11, wherein the sulfosuccinamate surfactant is a mixture of the sodium salts of sulfosuccinamate surfactants that have mixtures of saturated octadecyl and mono-unsaturated octadecenyl radicals in their molecules as alkyl groups.

13. A method of recovering oil or gas from a subterranean oil- or gas-bearing geological formation comprising the following steps:
generating a foam using a foam-forming surfactant composition of claim 1,
feeding the foam into a subterranean oil- or gas-bearing geological formation; and
collecting mineral oil or natural gas driven by the foam in a production well, wherein the foam is generated by intimate mixing of the foam-forming surfactant composition of claim 1 with a gas in a foam generator, or by
introducing at least one of water and gases, together or intermittently or in alternating sequence, or slugs of a gas in a supercritical or non-supercritical state, and of water, wherein the foam-forming surfactant composition of claim 1 is admixed to the water or to the gas if the gas is in a supercritical state, or is introduced separately as solution into a subterranean oil- or gas-bearing geological formation.

14. The method of claim 13, wherein the feeding and collecting steps are performed at a temperature of from 10° C. to 95° C., and wherein the foam-forming surfactant composition further comprises a diester sulfosuccinate, wherein the ratio of the mass m(SSA) of sulfosuccinamates to the sum m(MSS)+m(DSS) of the mass m(MSS) of monoester sulfosuccinates and the mass m(DSS) of diester sulfosuccinates is 20:80<m(SSA)/[m(MSS)+m(DSS)]<95:5.

15. The method of claim 13, wherein the mass fraction w(SF) of the surfactants present in the foam-forming surfactant composition of claim 1, calculated as the ratio of the sum of their masses m(SF) to the mass m(FC) of the aqueous foam-forming surfactant composition, is from 0.5 g/kg to 100 g/kg.

16. The method of claim 13, wherein the sulfosuccinamate surfactant of the foam-forming surfactant composition of claim 1 is a mixture of the sodium salts of sulfosuccinamate surfactants that comprise mixtures of saturated octadecyl and mono-unsaturated octadecenyl radicals in their molecules as alkyl groups.

17. The method of claim 13, wherein the subterranean oil- or gas-bearing geological formation has a temperature of at least 25° C.

18. The method of claim 17, wherein the foam-forming surfactant composition and/or the water present in the subterranean oil- or gas-bearing geological formation comprises a mass fraction of at least 0.2% of dissolved inorganic salts.

* * * * *